US012231174B2

(12) United States Patent
Cavaliere et al.

(10) Patent No.: US 12,231,174 B2
(45) Date of Patent: Feb. 18, 2025

(54) SELF-COHERENT OPTICAL TRANSMISSION SYSTEM AND RECEIVER

(71) Applicant: Telefonaktiebolaget LM Ericsson (publ), Stockholm (SE)

(72) Inventors: Fabio Cavaliere, Pisa (IT); Luca Giorgi, Pisa (IT); Luca Poti, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 64 days.

(21) Appl. No.: 17/920,592

(22) PCT Filed: Apr. 21, 2020

(86) PCT No.: PCT/EP2020/061100
§ 371 (c)(1),
(2) Date: Oct. 21, 2022

(87) PCT Pub. No.: WO2021/213637
PCT Pub. Date: Oct. 28, 2021

(65) Prior Publication Data
US 2023/0155688 A1    May 18, 2023

(51) Int. Cl.
*H04B 10/60* (2013.01)
*H04B 10/61* (2013.01)
(Continued)

(52) U.S. Cl.
CPC ....... *H04B 10/6151* (2013.01); *H04B 10/614* (2013.01); *H04B 10/50* (2013.01);
(Continued)

(58) Field of Classification Search
CPC .................. H04B 10/6151; H04B 10/614; H04B 10/615; H04B 10/50; H04B 10/505; H04B 10/60; H04B 10/61; H04J 14/06
(Continued)

(56) References Cited

U.S. PATENT DOCUMENTS 6,384,956 B1 * 5/2002 Shieh ..................... G02F 1/0136
359/256
7,343,100 B2 * 3/2008 Yao .......................... H04J 14/06
385/11
(Continued)

FOREIGN PATENT DOCUMENTS

WO    2011051437 A1    5/2011
WO    2017048899 A1    3/2017

OTHER PUBLICATIONS

Sacher, Wesley D., et al., "Polarization rotator-splitters in standard active silicon photonics platforms", Optics Express, vol. 22, No. 4, Feb. 10, 2014, pp. 3777-3786.
(Continued)

*Primary Examiner* — Dibson J Sanchez
(74) *Attorney, Agent, or Firm* — Sage Patent Group

(57) ABSTRACT

An optical receiver (100) comprising: a polarisation controller (102) arranged to receive as its input a first modulated optical signal having a first polarisation and an unmodulated optical carrier signal polarisation aligned with the first modulated optical signal, the first modulated optical signal having negligible spectral power density within a predetermined bandwidth, BW, around an optical spectrum of the unmodulated optical carrier signal; optical filter apparatus (104) having a main polarisation mode; and coherent optical receiver apparatus (106), wherein the polarisation controller is arranged to apply polarisation rotations to the first modulated optical signal and the unmodulated optical carrier signal such that their polarisation is aligned to the main polarisation mode of the optical filter apparatus, the optical filter apparatus is arranged to receive and separate the unmodulated optical carrier signal from the first modulated optical signal, and the coherent optical receiver apparatus is arranged to receive said separated signals and perform
(Continued)

coherent detection of the first modulated optical signal using as a local oscillator, LO, signal the unmodulated optical carrier signal.

6 Claims, 5 Drawing Sheets

(51) Int. Cl.
  *H04B 10/50* (2013.01)
  *H04J 14/06* (2006.01)
(52) U.S. Cl.
  CPC ............ *H04B 10/505* (2013.01); *H04B 10/60* (2013.01); *H04B 10/61* (2013.01); *H04J 14/06* (2013.01)
(58) Field of Classification Search
  USPC .................. 398/43–103, 182–201, 202–214
  See application file for complete search history.

(56) References Cited

U.S. PATENT DOCUMENTS

| | | | | | |
|---|---|---|---|---|---|
| 8,693,895 | B2* | 4/2014 | Yang | .................... | H04B 10/516 |
| | | | | | 398/140 |
| 9,203,517 | B2* | 12/2015 | Zhou | .................... | H04B 10/532 |
| 10,003,408 | B2* | 6/2018 | Han | .................... | H04B 10/615 |
| 10,735,128 | B1* | 8/2020 | Esman | ................ | H04J 14/0221 |
| 2005/0117915 | A1* | 6/2005 | Miyazaki | ............ | H04B 10/5051 |
| | | | | | 398/188 |
| 2009/0092393 | A1* | 4/2009 | Xu | ..................... | H04L 27/2647 |
| | | | | | 398/79 |
| 2010/0080560 | A1* | 4/2010 | Mertz | .................... | H04B 10/67 |
| | | | | | 398/202 |
| 2010/0098420 | A1* | 4/2010 | Ibragimov | ......... | H04B 10/0775 |
| | | | | | 398/65 |
| 2010/0189438 | A1* | 7/2010 | Hoshida | .................. | H04J 14/06 |
| | | | | | 398/65 |
| 2010/0316393 | A1* | 12/2010 | Schmidt | ............. | H04B 10/6151 |
| | | | | | 398/205 |
| 2012/0207476 | A1* | 8/2012 | Agrell | ..................... | H04J 14/02 |
| | | | | | 398/65 |
| 2013/0034354 | A1* | 2/2013 | Okamoto | ............. | H04B 10/671 |
| | | | | | 398/65 |
| 2015/0117872 | A1* | 4/2015 | Lyubomirsky | ...... | H04J 14/0305 |
| | | | | | 398/205 |
| 2016/0065314 | A1 | 3/2016 | Nazarathy et al. | | |
| 2019/0229811 | A1 | 7/2019 | Gupta et al. | | |
| 2019/0393974 | A1* | 12/2019 | Xu | ..................... | H04B 10/2519 |

OTHER PUBLICATIONS

Sadot, Dan, et al., "Tunable Optical Filters for Dense WDM Networks", IEEE Communications Magazine,, Dec. 1998, pp. 50-55.
Sorianello, V., et al., "Polarization Controller for Si photonic integrated circuits with an active closed loop control", 42nd European Conference on Optical Communications, Dusseldorf, Sep. 2016, pp. 18-22.

* cited by examiner

SELF-COHERENT OPTICAL TRANSMISSION SYSTEM AND RECEIVER

TECHNICAL FIELD

The invention relates to an optical receiver and to a self-coherent optical transmission system including the optical receiver. The method further relates to a method of coherent optical detection and to a method of self-coherent optical transmission including the method of coherent optical detection.

BACKGROUND

In the overwhelming majority of current optical transport networks, transmission at 100 Gbit/s is performed by means of dual polarization quadrature phase-shift keying, QPSK, coherent optical interfaces. Capacity enhancement at 400 Gbit/s is possible by using 16 level quadrature amplitude modulation, 16QAM, instead of QPSK and doubling device bandwidths from 25 to 50 GHz. Standards for interoperable 100 and 400 Gbit/s optical interfaces operating over metro distances are specified by International Telecommunication Union-Telecommunication, ITU-T, Recommendation G.6982 and Optical Internetworking Forum, OIF, project 400ZR, respectively.

Compared to intensity-modulated direct-detection systems, where data is encoded onto amplitude levels of an optical signal, coherent systems transmit and detect information encoded on both signal amplitude and phase. This has the twofold advantage of allowing the use of complex modulation schemes, such as QAM, increasing system capacity, and the use of equalization techniques for recovering propagation impairments such as the fiber chromatic dispersion. The latter feature has led to a big saving of network costs, avoiding the use of dispersion compensating fiber (and double stage optical amplifiers to host it) in the optical link. The absence of dispersion compensating fiber has greatly simplified system design rules (in old systems, dimensioning position and size of the compensating modules was crucial for optimizing the system performance), positively impacting on operational cost. Although coherent optical transmission was proposed decades ago, it could be deployed only after the miniaturization and the integration of electronic circuits made it possible to implement complex processing functions in small integrated circuits, with acceptable power consumptions of a few tens of Watts.

Photonic circuits have followed a similar path towards a higher integration, though with considerable delay; the number of functions that can be integrated in a photonic chip is an order of magnitude less than the functions in an electronic chip of the same size. Moreover, the optical processing functions are mostly analogue, reducing the processing possibilities compared to what can be done with electronic processing. However, combining photonic and electronic processing in the same system can enable new architectures with improved cost and power consumption.

The success of coherent optical transmission in metro and long-haul optical networks (spanning form hundreds to thousands km) cannot be replicated in shorter distance radio and fixed access networks, which are more cost sensitive. Energy efficiency is another issue; the integrated circuits used for signal post-processing in a coherent receiver consume tens of Watts while a few Watts would be acceptable. On the other hand, the capacity required by modern radio access networks can easily achieve hundreds of Gbit/s, making coherent transmission an appealing technique despite cost and power consumption issues.

Coherent optical systems use a laser at the receiver as local oscillator. The local oscillator light is coupled to the received signal. If the local oscillator frequency equals the transmitted optical carrier frequency, the beating term generated by photodetection is proportional to the modulated signal. If not, there is a frequency offset (some GHz in practical systems) to be compensated for at the receiver, increasing the digital signal processing, DSP, complexity. In both cases, the local oscillator phase noise is transferred onto the signal and mitigating this requires costly narrow-linewidth lasers to be used as the local oscillator. Coherent optical systems use a laser at the receiver as local oscillator. The local oscillator light is coupled to the received signal. If the local oscillator frequency equals the transmitted optical carrier frequency, the beating term generated by photodetection is proportional to the modulated signal. If not, there is a frequency offset (some GHz in practical systems) to be compensated for at the receiver, increasing the DSP complexity. In both cases, the local oscillator phase noise is transferred onto the signal: mitigating it requires costly narrow-linewidth lasers to be used as local oscillator.

Self-coherent optical systems do not have a local oscillator at the receiver but instead transmit the optical carrier together with the modulated signal (the optical carrier is suppressed at the transmitter in a regular coherent optical system), avoiding the issues of frequency offset and phase noise transfer. However, proper techniques must be used in a self-coherent receiver to separate the unmodulated carrier and the modulated signal.

To double the bit-rate of the transmitted signal, data may be sent over two linear orthogonal polarization states. During the propagation in fiber links, the two polarization states remain orthogonal but rotate so that the angle with the polarization state of the local oscillator is random. At the front-end of a regular coherent receiver, the local oscillator and the modulated signal are mixed in a so-called 90° hybrid device and the output detected by a photodiode (dual polarization receiver). Alternatively, a polarization controller may be used to rotate the polarization of the local oscillator, aligning it to the received modulated signal. For example, a polarization controller based on phase shifters in optical interferometers is reported in V. Sorianello et al. "*Polarization Controller for Si photonic integrated circuits with an active closed loop control*", 42$^{nd}$ European Conference on Optical Communications, Dusseldorf, 18-22 Sep. 2016. After photodetection, the data transmitted on the two polarizations is recovered by means of an electrical equalizer.

In a self-coherent system, the transmitted optical carrier is used as local oscillator so that its angle with the received signal is known and no polarization recovery is needed.

SUMMARY

It is an object to provide an improved optical receiver. It is a further object to provide an improved self-coherent optical transmission system. It is a further object to provide an improved method of coherent optical detection. It is a further object to provide an improved method of self-coherent optical transmission.

An aspect of the invention provides an optical receiver comprising a polarisation controller, optical filter apparatus and coherent optical receiver apparatus. The polarisation controller is arranged to receive as its input a first modulated optical signal having a first polarisation and an unmodulated optical carrier signal polarisation aligned with the first modulated optical signal. The first modulated optical signal has negligible spectral power density within a predetermined bandwidth, BW, around an optical spectrum of the unmodulated optical carrier signal. The optical filter apparatus has a main polarisation mode. The polarisation controller is arranged to apply polarisation rotations to the first modulated optical signal and the unmodulated optical carrier signal such that their polarisation is aligned to the main polarisation mode of the optical filter apparatus. The optical filter apparatus is arranged to receive the unmodulated optical carrier signal and the first modulated optical signal from the polarisation controller and is arranged to separate the unmodulated optical carrier signal from the first modulated optical signal. The coherent optical receiver apparatus is arranged to receive said separated signals from the optical filter apparatus and is arranged to perform coherent detection of the first modulated optical signal using as a local oscillator, LO, signal the unmodulated optical carrier signal.

The optical receiver may mitigate phase noise transfer from a local oscillator signal (the unmodulated optical carrier signal) to the received modulated optical signal without requiring the use of costly narrow linewidth lasers as a local oscillator source. The optical receiver does not require any recovery of frequency offset between a local oscillator signal and a transmitted optical carrier signal. Polarisation alignment of the first modulated optical signal and the unmodulated optical carrier signal to the main polarisation mode of the optical filter apparatus enables the optical front-end, particularly the optical filter apparatus, to be cost effectively implemented in Silicon Photonics.

In an embodiment, the polarisation controller is arranged to additionally receive a second modulated optical signal having a second polarisation orthogonal to the first polarisation. The polarisation controller is arranged to separate the second modulated optical signal from the first modulated optical signal and the unmodulated optical carrier signal. The optical receiver further comprises second coherent optical receiver apparatus arranged to perform coherent detection of the second modulated optical signal using as a local oscillator, LO, signal part of the unmodulated optical carrier signal output from the optical filter apparatus.

In an embodiment, the polarisation controller is a polarisation rotator-splitter.

In an embodiment, the optical filter apparatus comprises an optical band splitter having a first output, a second output and an input arranged to receive the unmodulated optical carrier signal and the first modulated optical signal from the polarisation controller, wherein the optical band splitter is arranged to send optical signals within a first spectral band including the optical spectrum of the unmodulated optical carrier signal to the first output and to send optical signals within a second spectral band including an optical spectrum of the first modulated optical carrier signal to the second output.

In an embodiment, the optical band splitter is one of a Bragg grating and a ring resonator. The Bragg grating is configured to reflect one of the first spectral band and the second spectral band and configured to transmit the other of the first spectral band and the second spectral band. The ring resonator has a resonance peak configured to drop optical signals within the first spectral band to the first output and to transmit optical signals within the second spectral band to the second output.

In an embodiment, the first spectral band has a bandwidth greater than twice a linewidth of the optical spectrum of the unmodulated optical carrier signal and less than twice said predetermined bandwidth, BW. This may ensure effective separation of the unmodulated optical carrier signal from the first modulated optical signal.

In an embodiment, the optical band splitter is a tunable optical band splitter. The optical receiver further comprises a controller. The controller is configured to generate control signals for the polarisation controller. The control signals are configured to control the applied polarisation rotations. The controller is further configured to generate control signals for the tunable optical band splitter. The control signals are configured to tune at least one of the first spectral band and the second spectral band. The controller is arranged to modify the control signals until the optical power of the unmodulated optical carrier signal output from the optical filter apparatus is maximised.

Use of a tunable optical band splitter may enable compensation of frequency drift of the unmodulated optical carrier signal, due for example to thermal drift. Having a common controller for controlling the applied polarization rotations and the tuning of the tunable optical band splitter may enable fast convergence and mitigate outage issues, such as insufficient dynamic range, faced by prior art polarization controllers.

In an embodiment, the main polarisation mode is a linearly polarised main propagation mode. Polarisation alignment of the first modulated optical signal and the unmodulated optical carrier signal to linearly polarised main propagation mode of the optical filter apparatus enables the optical filter apparatus to be cost effectively implemented in Silicon Photonics.

Corresponding embodiments and advantages apply to the self-coherent optical transmission system described below.

An aspect of the invention provides a self-coherent optical transmission system comprising an optical receiver and an optical transmitter.

The optical receiver comprises a polarisation controller, optical filter apparatus and coherent optical receiver apparatus. The polarisation controller is arranged to receive as its input a first modulated optical signal having a first polarisation and an unmodulated optical carrier signal polarisation aligned with the first modulated optical signal. The first modulated optical signal has negligible spectral power density within a predetermined bandwidth, BW, around an optical spectrum of the unmodulated optical carrier signal. The optical filter apparatus has a main polarisation mode. The polarisation controller is arranged to apply polarisation rotations to the first modulated optical signal and the unmodulated optical carrier signal such that their polarisation is aligned to the main polarisation mode of the optical filter apparatus. The optical filter apparatus is arranged to receive the unmodulated optical carrier signal and the first modulated optical signal from the polarisation controller and is arranged to separate the unmodulated optical carrier signal from the first modulated optical signal. The coherent optical receiver apparatus is arranged to receive said separated signals from the optical filter apparatus and is arranged to perform coherent detection of the first modulated optical signal using as a local oscillator, LO, signal the unmodulated optical carrier signal.

The optical transmitter comprises an optical source arranged to generate an optical carrier signal, an optical modulator and an optical splitter. The optical splitter is arranged to power split the optical carrier signal and is arranged to route a first part of the optical carrier signal to the optical modulator and to route a second part of the optical carrier signal to bypass the optical modulator. The optical modulator is arranged to apply signal encoding to the first part of the optical carrier signal to form a first modulated optical signal. The signal encoding is configured to cause the first modulated optical signal to have negligible spectral power density within a predetermined bandwidth, BW, around an optical spectrum of the optical carrier signal. The first modulated optical signal has a first polarisation and the unmodulated optical carrier signal is polarisation aligned with the first modulated optical signal. The optical transmitter is configured to combine the first modulated optical signal and the unmodulated optical carrier signal for transmission.

The signal encoding may ensure that the unmodulated optical carrier signal and the first modulated optical signal are spectrally separated, such that there is a band gap between them, enabling the optical filter apparatus at the optical receiver to effectively separate the unmodulated optical carrier signal from the first modulated optical signal. Forming the unmodulated optical carrier signal and the first modulated optical signal from the same optical carrier signal mitigates phase noise transfer from the local oscillator signal (unmodulated optical carrier signal) to the first modulated optical signal at the optical receiver and ensures that the local oscillator signal and the first modulated optical signal remain polarisation aligned during transmission.

In an embodiment, the optical modulator comprises a dual polarisation modulator arranged to split the first part of the optical carrier signal into a first optical signal having the first polarisation and a second optical signal having a second, orthogonal polarisation. The dual polarisation modulator is arranged to apply respective signal encodings to the first and second optical signals to form a first modulated optical signal having the first polarisation and a second modulated optical signal having the second, orthogonal polarisation. The dual polarisation modulator is configured to combine the first modulated optical signal and the unmodulated optical carrier signal for transmission. Dual polarisation modulated optical signals may therefore be transmitted with an unmodulated optical carrier signal for use as a common local oscillator signal at the optical receiver, the polarisation of the unmodulated optical carrier signal being aligned with one of the modulated optical signals, namely the first modulated optical signal.

In an embodiment, the optical modulator is arranged to apply signal encoding having a cut off frequency equal to or higher than the predetermined bandwidth. This may ensure that the unmodulated optical carrier signal and the first modulated optical signal are spectrally separated.

An aspect of the invention provides a method of coherent optical detection comprising the following steps. A step of receiving a first modulated optical signal having a first polarisation and an unmodulated optical carrier signal polarisation aligned with the first modulated optical signal, the first modulated optical signal has negligible spectral power density within a predetermined bandwidth, BW, around an optical spectrum of the optical carrier signal. A next step of applying polarisation rotations to the first modulated optical signal and the unmodulated optical carrier signal such that their polarisation is aligned to a main polarisation mode. A next step, acting on said signals aligned to the main polarisation mode, of separating the unmodulated optical carrier signal from the first modulated optical signal. A next step, using said separated signals, of performing coherent detection of the first modulated optical signal using as a local oscillator signal the unmodulated optical carrier signal.

The method may mitigate phase noise transfer from a local oscillator signal (the unmodulated optical carrier signal) to the received modulated optical signal without requiring the use of costly narrow linewidth lasers as a local oscillator source. The method does not require any recovery of frequency offset between a local oscillator signal and a transmitted optical carrier signal.

In an embodiment, the method further comprises the following steps. A step of receiving a second modulated optical signal having a second polarisation orthogonal to the first polarisation. A step of separating the second modulated optical signal from the first modulated optical signal and the unmodulated optical carrier signal. A step, using said separated signals, of performing coherent detection of the second modulated optical signal using as a local oscillator signal the unmodulated optical carrier signal.

In an embodiment, separating the unmodulated optical carrier signal from the first modulated optical signal comprises band splitting the unmodulated optical carrier signal and the first modulated optical signal. The band splitting is arranged to send optical signals within a first spectral band including the optical spectrum of the unmodulated optical carrier signal to a first output and to send optical signals within a second spectral band including an optical spectrum of the first modulated optical carrier signal to a second output.

In an embodiment, the first spectral band has a bandwidth greater than twice a linewidth of the optical spectrum of the unmodulated optical carrier signal and less than twice said predetermined bandwidth, BW. This may ensure effective separation of the unmodulated optical carrier signal from the first modulated optical signal.

In an embodiment, the method further comprises varying the applied polarisation rotations and tuning at least one of the first spectral and the second spectral band until an optical power of the unmodulated optical carrier signal after said separating is maximised. Any frequency drift, for example due to thermal drift, in the unmodulated optical carrier signal may thereby be compensated for during the separating.

Corresponding embodiments and advantages apply to the method of self-coherent optical transmission described below.

An aspect of the invention provides a method of self-coherent optical transmission comprising the following transmitting steps and receiving and detecting steps. The transmitting steps include a step of generating an optical carrier signal having a first polarisation. A next step of power splitting the optical carrier signal. A next step of applying signal encoding to a first part of the optical carrier signal to form a first modulated optical signal. The signal encoding is configured to cause the first modulated optical signal to have negligible spectral power density within a predetermined bandwidth, BW, around an optical spectrum of the optical carrier signal. A next step of combining the first modulated optical signal with a second, unmodulated, part of the optical carrier signal, the first modulated optical signal has a first polarisation and the unmodulated optical carrier signal is polarisation aligned with the first modulated optical signal. A next step of transmitting said combined signals.

The method further comprises, following transmission, the following receiving and detecting steps. A step of receiving a first modulated optical signal having a first polarisation and an unmodulated optical carrier signal polarisation aligned with the first modulated optical signal, the first modulated optical signal has negligible spectral power density within a predetermined bandwidth, BW, around an optical spectrum of the optical carrier signal. A next step of applying polarisation rotations to the first modulated optical signal and the unmodulated optical carrier signal such that their polarisation is aligned to a main polarisation mode. A next step, acting on said signals aligned to the main polarisation mode, of separating the unmodulated optical carrier signal from the first modulated optical signal. A next step, using said separated signals, of performing coherent detection of the first modulated optical signal using as a local oscillator signal the unmodulated optical carrier signal.

The signal encoding may ensure that the unmodulated optical carrier signal and the first modulated optical signal are spectrally separated, such that there is a band gap between them, enabling effective separation of the unmodulated optical carrier signal from the first modulated optical signal. Forming the unmodulated optical carrier signal and the first modulated optical signal from the same optical carrier signal mitigates phase noise transfer from the local oscillator signal (unmodulated optical carrier signal) to the first modulated optical signal and ensures that the local oscillator signal and the first modulated optical signal remain polarisation aligned during transmission.

In an embodiment, the modulating comprises polarisation splitting the first part of the optical carrier signal into a first optical signal having the first polarisation and a second optical signal having a second, orthogonal polarisation and applying respective signal encodings to the first and second optical signals to form the first modulated optical signal having the first polarisation and a second modulated optical signal having the second, orthogonal polarisation. Dual polarisation modulated optical signals may therefore be transmitted with an unmodulated optical carrier signal for use as a common local oscillator signal at the optical receiver, the polarisation of the unmodulated optical carrier signal being aligned with one of the modulated optical signals, namely the first modulated optical signal.

In an embodiment, the signal encoding applied to the first optical signal has a cut off frequency equal to or higher than the predetermined bandwidth, BW. This may ensure that the unmodulated optical carrier signal and the first modulated optical signal are spectrally separated.

Embodiments of the invention will now be described, by way of example only, with reference to the accompanying drawings.

DETAILED DESCRIPTION

The same reference numbers will used for corresponding features in different embodiments.

Figure 1:
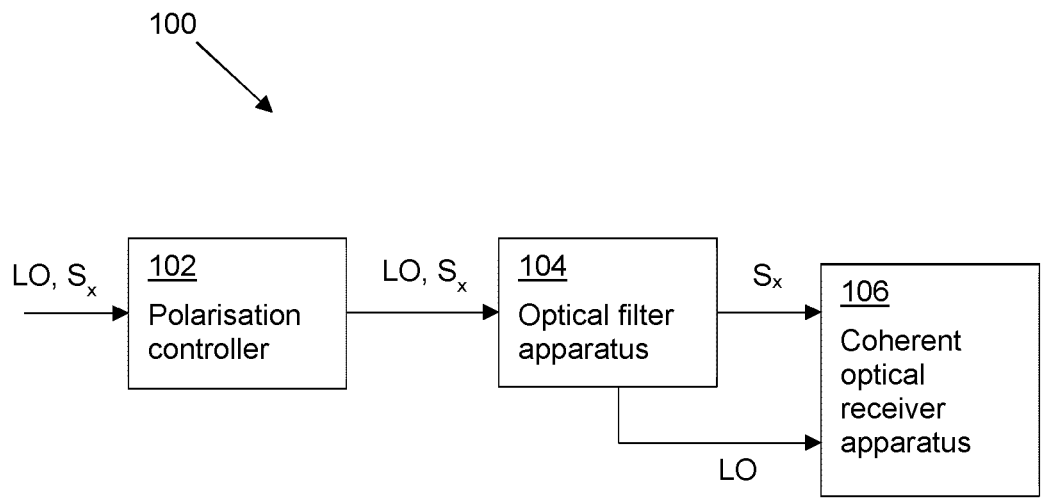
FIGS. 1 and 2 are block diagrams illustrating embodiments of an optical receiver.

Referring to FIG. 1, an embodiment provides an optical receiver 100 comprising a polarisation controller 102, optical filter apparatus 104 having a main polarisation mode and coherent optical receiver apparatus 106. The polarisation controller is arranged to receive as its input a first modulated optical signal, $S_x$, and an unmodulated optical carrier signal, LO. The first modulated optical signal has a first polarisation and the unmodulated optical carrier signal is polarisation aligned with the first modulated optical signal. The first modulated optical signal has negligible spectral power density within a predetermined bandwidth, BW, around the optical spectrum of the unmodulated optical carrier signal.

The polarisation controller 102 is arranged to apply polarisation rotations to the first modulated optical signal and the unmodulated optical carrier signal such that their polarisation is aligned to the main polarisation mode of the optical filter apparatus.

The optical filter apparatus 104 may be arranged to receive the unmodulated optical carrier signal and the first modulated optical signal from the polarisation controller; the unmodulated optical carrier signal and the first modulated optical signal may therefore be received by the optical filter apparatus with their polarisation aligned to the main polarisation mode of the optical filter apparatus. The optical filter apparatus may be arranged to separate the unmodulated optical carrier signal from the first modulated optical signal.

The coherent optical receiver apparatus 106 may be arranged to receive the separated unmodulated optical carrier signal, LO, and first modulated optical signal, $S_x$, from the optical filter apparatus. The coherent receiver apparatus may be arranged to perform coherent detection of the first modulated optical signal using as a local oscillator, LO, signal the unmodulated optical carrier signal.

In an embodiment, the main polarisation mode of the optical filter is a linearly polarised main propagation mode of the optical filter.

Figure 2:
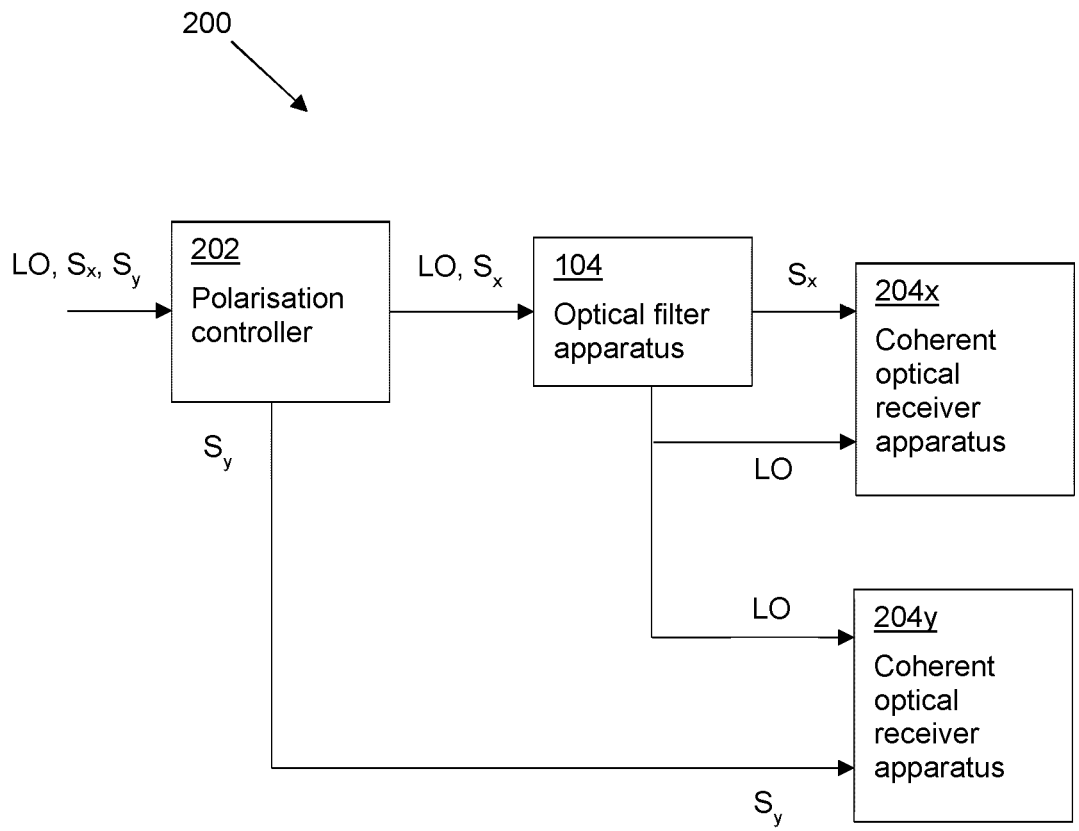

In the optical receiver 200 of the embodiment illustrated in FIG. 2, the polarisation controller 202 may be arranged to additionally receive a second modulated optical signal, $S_y$. The second modulated optical signal has a second polarisation, orthogonal to the first polarisation. The polarisation controller 202 is arranged to separate the second modulated optical signal from the first modulated optical signal and the unmodulated optical carrier signal.

The optical receiver 200 of this embodiment may comprise a first coherent optical receiver apparatus 204$x$ and a second coherent optical receiver apparatus 204$y$, respectively arranged to perform coherent detection of the first and second modulated optical signals. Both the first and second coherent optical receiver apparatus as a local oscillator, LO, signal part of the unmodulated optical carrier signal output from the optical filter apparatus 104.

In one embodiment, the polarisation controller 202 may be a polarisation rotator-splitter, such as described, for example, in Wesley D. Sacher et al, "Polarization rotator-splitters in standard active silicon photonics platforms", Optics Express, Vol. 22, No. 4, pages 3777-3786, 10 Feb. 2014.

Figure 3:
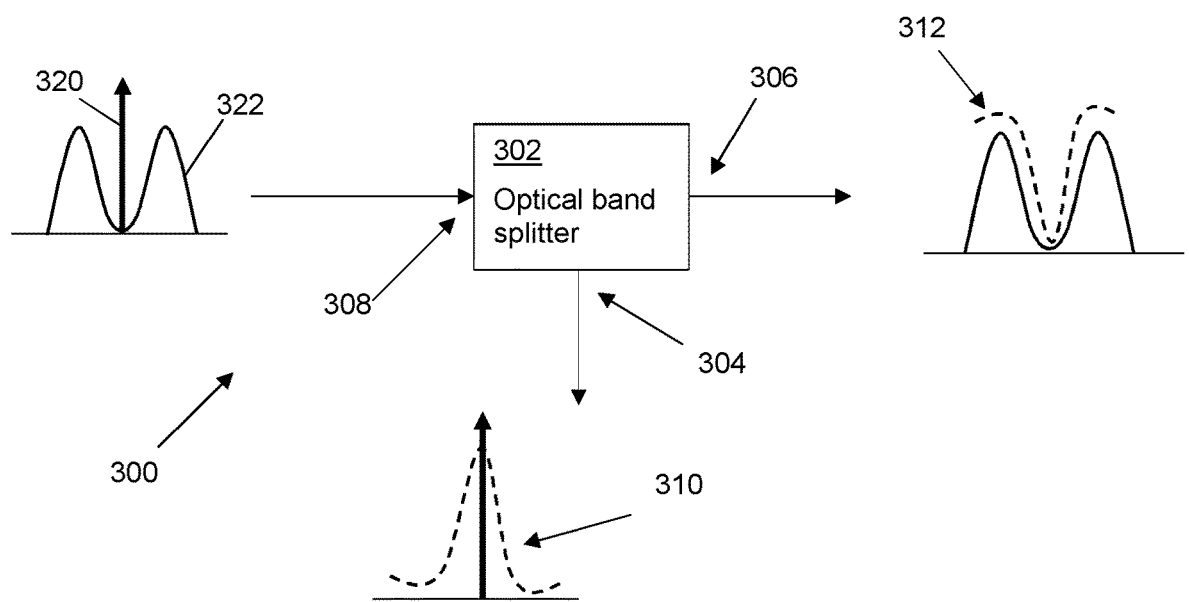
FIG. 3 is a block diagram illustrating an optical filter apparatus of an embodiment of an optical receiver.

In an embodiment, the optical filter apparatus 300 may comprise an optical band splitter 302, as illustrated in FIG. 3. The optical band splitter may be used in either of the optical receivers 100, 200 described above.

An optical band splitter is a device that splits the spectrum of an input signal into two portions, having separate frequency bands, sending each band to a different output. The signal encoding applied here ensures that there is a band gap between the portions.

The optical band splitter has a first output 304, a second output 306 and an input 308 arranged to receive the unmodulated optical carrier signal 320 and the first modulated optical signal 322 from the polarisation controller 102, 202. The optical band splitter is arranged to send optical signals within a first spectral band 310 to the first output and to send optical signals within a second spectral band 312 to the second output. The first spectral band includes the optical spectrum of the unmodulated optical carrier signal 320 and the second spectral band includes the optical spectrum of the first modulated optical carrier signal 322. The optical band splitter effective acts as a bandpass filter as far as the unmodulated optical carrier signal is concerned and a notch filter as far as the first modulated optical signal is concerned.

The optical band splitter may, for example, be a Bragg grating, formed in optical fibre or a planar waveguide, configured to reflect one of the first spectral band and the second spectral band and configured to transmit the other of the first spectral band and the second spectral band. In the example illustrated in FIG. 3, the Bragg grating is configured to reflect the first spectral band and to transmit the second spectral band.

The optical band splitter may alternatively, for example, be a ring resonator, formed in optical fibre or planar waveguides, having a resonance peak configured to drop optical signals within the first spectral band to the first output and to transmit optical signals within the second spectral band to the second output.

The optical band splitter may alternatively, for example, be an optical power splitter followed by a band pass filter and a band stop filter on its two output arms.

In an embodiment, the first spectral band has a bandwidth greater than twice a linewidth of the optical spectrum of the unmodulated optical carrier signal and less than twice the predetermined bandwidth, BW, around the optical spectrum of the unmodulated optical carrier signal.

Figure 4:
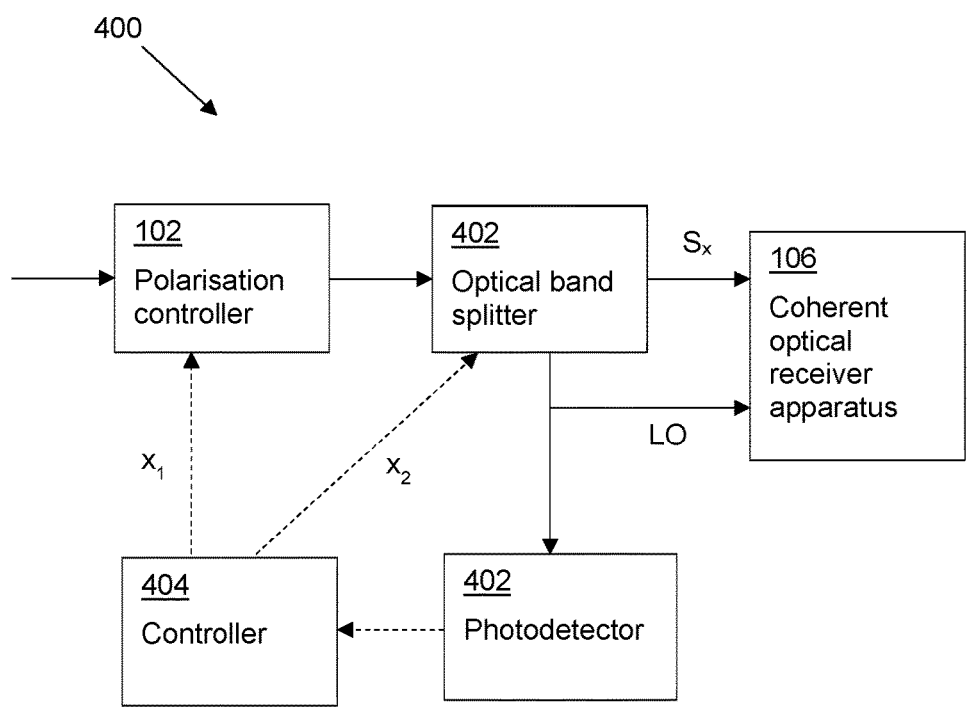
FIG. 4 is a block diagram illustrating an embodiment of an optical receiver.

In the optical receiver 400 of the embodiment illustrated in FIG. 4, the optical band splitter may be a tunable optical band splitter 402. The optical receiver further comprises a photodetector 402 and a controller 404.

The controller comprises interface circuitry and control circuitry configured to generate control signals, $X_1$, for the polarisation controller 102 (or 202). The control signals are configured to control the applied polarisation rotations, so that the polarisation of the first modulated optical signal and the unmodulated optical carrier signal can be rotated to align with the main polarisation mode of the optical filter apparatus; if the signals happen to be received with their polarisation aligned with the main polarisation mode of the optical filter apparatus, zero polarisation rotation is applied.

The polarisation controller may, for example, comprise a series of Mach Zehnder interferometers, as described in V. Sorianello et al. "*Polarization Controller for Si photonic integrated circuits with an active closed loop control*", $42^{nd}$ European Conference on Optical Communications, Dusseldorf, 18-22 Sep. 2016. The control signals comprise three voltage levels that control the phase shifts in the arms three respective Mach Zehnder interferometers.

The tunable optical band splitter 402 may be a Bragg grating or a ring resonator, as described above, both of which may be configured to be tunable. As the skilled person will know, a Bragg grating may be tuned by varying an applied temperature or strain, and a ring resonator may be tuned by varying an applied temperature or injection current.

Alternatively, the tunable optical band splitter may comprise an acousto optic tunable filter, AOTF, an electro-optic tunable filter, EOTF, a tunable Fabry-Perot etalon, one or more arrayed waveguide gratings, AWG, one or more Mach Zhender Interferometers, MZI, an active optical filter, and a micro machined optical device, as described in D. Sadot and E. Bolmovich, "*Tunable optical filter for Dense WDM networks*", IEEE Communications Magazine, December 1998, pages 50-55.

The controller 404 is additionally configured to generate control signals, $X_2$, for the tunable optical band splitter 402. The control signals are configured to tune at least one of the first spectral band and the second spectral band. Where, for example, the tunable optical band splitter is a Bragg grating, varying applied temperature or strain will tune the first spectral band (the reflection band of the grating) and will correspondingly vary the transmission band, i.e. the second spectral band. Where the tunable optical band splitter is a ring resonator, varying applied temperature or injection current will tune the first spectral band (the resonance peak of the ring resonator), which will correspondingly vary the second spectral band.

The controller 404 is arranged to modify the control signals, $X_1$ and $X_2$, until the optical power of the unmodulated optical carrier signal, LO, output from the optical filter apparatus, measured using the photodetector 402, is maximised. This may comprise iteratively varying the applied polarisation rotation and tuning the first spectral band and/or second spectral band until they converge on values that maximise the optical power of the unmodulated optical carrier signal. Well known algorithms such as steepest descent or gradient algorithm may be used to perform the maximization.

For example, if a polarisation controller 202 is a polarisation rotator-splitter as described in in Wesley D. Sacher et al (ibid), the controller 404 is configured to iteratively adjust three voltages v1, v2 and v3, that control the phase shifts in the arms of the consecutive Mach Zehnder interferometers.

Figure 5:
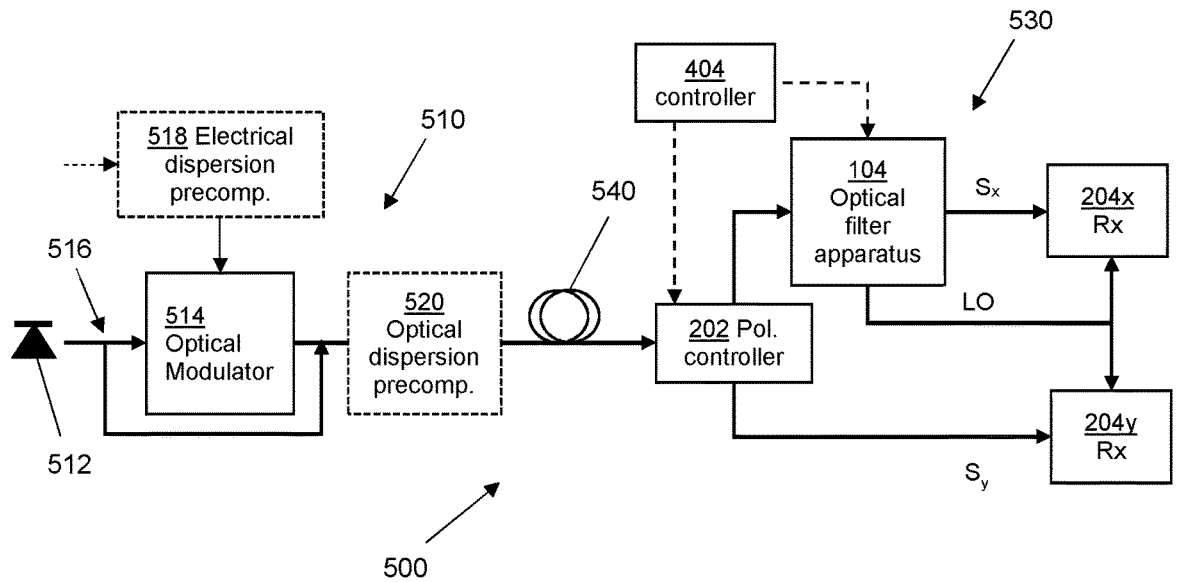
FIGS. 5 and 6 are block diagrams illustrating embodiments of an optical transmission system.

Referring to FIG. 5, an embodiment provides a self-coherent optical transmission system 500 comprising an optical transmitter 510 and an optical receiver 530, connected by an optical link 540.

The optical transmitter 510 comprises an optical source 512, an optical modulator 514 and an optical splitter 516.

The optical source 512 is typically a laser, arranged to generate an optical carrier signal having an optical spectrum and a first polarisation.

The optical splitter 516 is arranged to power split the optical carrier signal and is arranged to route a first part of the optical carrier signal to the optical modulator and to route a second part of the optical carrier signal to bypass the optical modulator, to become an unmodulated optical carrier signal.

The optical modulator 514 is arranged to apply signal encoding to the first part of the optical carrier signal to form a first modulated optical signal. The optical modulator shown in this embodiment may be a dual-polarisation optical modulator but it will be appreciated that a single polarisation optical modulator may alternatively be used, for transmission to an optical receiver described above with reference to FIG. 1 or 4.

The dual-polarisation optical modulator is arranged to split the first part of the optical carrier signal into a first optical signal having the first polarisation and a second optical signal having a second, orthogonal polarisation. The dual-polarisation optical modulator is arranged to apply respective signal encodings to the first and second optical signals to form a first modulated optical signal having the first polarisation and a second modulated optical signal having the second, orthogonal polarisation. The signal encoding is configured to cause the first modulated optical signal to have negligible spectral power density within a predetermined bandwidth, BW, around the optical spectrum of the optical carrier signal, and thus around the optical spectrum of the unmodulated optical carrier signal.

The first modulated optical signal has the first polarisation and the unmodulated optical carrier signal is polarisation aligned with the first modulated optical signal, since both originate from the optical carrier signal.

The optical transmitter is configured to combine the first modulated optical signal, the second modulated optical signal and the unmodulated optical carrier signal for transmission.

In an embodiment, the optical modulator may be arranged to apply signal encoding having a cut off frequency equal to or higher than the predetermined bandwidth, BW. The signal encoding is configured to deplete the signal spectrum around the DC component (the optical carrier signal) and may be one of Manchester encoding, Alternate Mark Inversion, AMI, encoding or 64B66B encoding.

In an embodiment, the optical transmitter 510 additionally comprises electrical dispersion pre-compensation apparatus 518 and/or optical dispersion pre-compensation apparatus 520 configured to apply pre-compensation for the chromatic dispersion that the first modulated optical signal, the second modulated optical signal and the unmodulated optical carrier signal will accumulated during transmission across the optical link 540.

The optical receiver 530 is as described above with reference to FIG. 2, comprising a polarisation controller 202, optical filter apparatus 104, a first coherent optical receiver 204x and a second coherent optical receiver 204y, with the addition of a controller 404, as described above with reference to FIG. 4.

At the optical receiver, the first modulated optical signal, the second modulated optical signal and the unmodulated optical carrier signal arrive with their polarisations rotated at a random angle with respect to their transmitted first and second polarisations. The polarisation controller rotates the polarisations of the dual polarisation signals.

In an embodiment, the polarisation controller may be a polarisation rotator-splitter configured to both apply polarisation rotations and separate the orthogonally polarised first and second modulated optical signals, sending the two signals to two outputs. A polarisation rotator-splitter as described in Wesley D. Sacher et al, "*Polarization rotator-splitters in standard active silicon photonics platforms*", Optics Express Vol. 22, No. 4, 24 Feb. 2014, pages 3777-3786 may be used.

Figure 6:
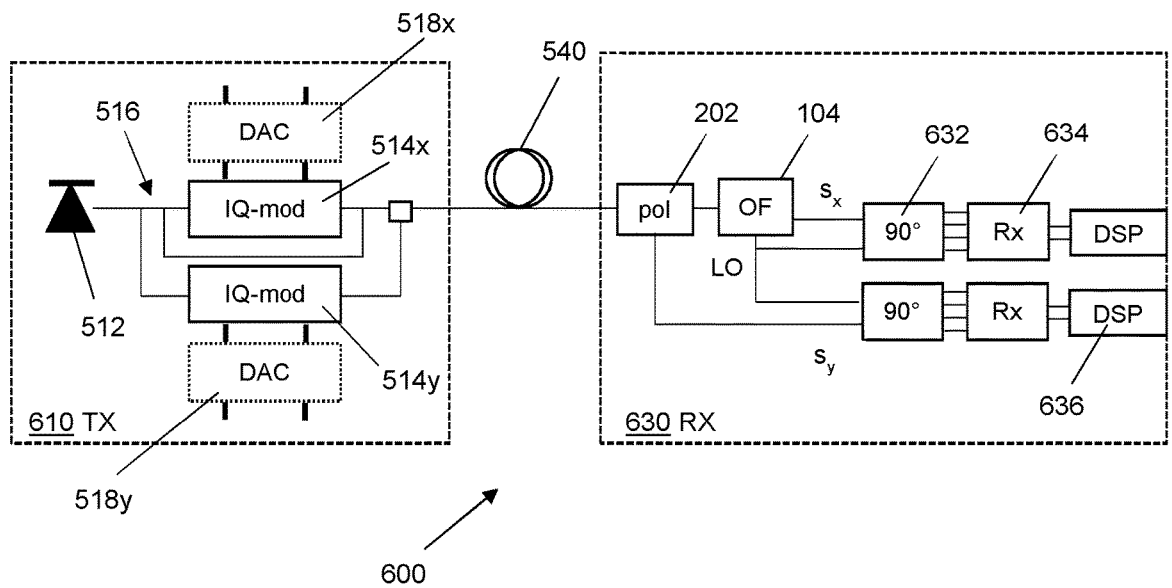

Referring to FIG. 6, an embodiment provides a self-coherent optical transmission system 600 comprising an optical transmitter 610 and an optical receiver 630, connected by an optical link 540.

In this embodiment, the optical modulator may comprise a first IQ-modulator 514x and a second IQ-modulator 514y. The first IQ-modulator is configured to apply signal encoding to the first optical signal having the first polarisation and the second IQ-modulator is configured to apply signal encoding to the second optical signal having the second, orthogonal polarisation.

Each IQ-modulator 514x, 514y is provided with a respective digital to analog converter, DAC, 518x, 518y, configured to apply the electrical dispersion pre-compensation.

At the optical receiver 630, the first and second coherent optical receivers comprise respective 90° optical hybrids, balanced photodetectors, Rx, 634 and digital signal processing, DSP, modules 636.

The above described embodiments provide a self-coherent optical transmission system in which:
- at the transmitter an unmodulated optical carrier is sent together with the modulated signal and the modulated signal is encoded so that its spectral power density is negligible within a predetermined bandwidth, BW, around the carrier;
- in a dual polarization system, the optical carrier signal polarization is aligned with one of the two modulated optical signals transmitted on two orthogonal polarization states;
- the receiver includes a polarization controller followed by an optical filter apparatus to extract the unmodulated optical carrier signal, for use as a local oscillator signal;
- the optical filter apparatus separates the optical carrier from the modulated optical signal, by means of a passband narrowband tunable optical filter having a bandwidth is equal or narrower than the predetermined bandwidth, BW;
- the polarisation controller and the optical filter apparatus may be cost effectively realised in silicon photonics and many be monolithically integrated;
- the optical filter apparatus is tunable to compensate for frequency drift of the optical carrier signal generated at the optical transmitted, for example due to thermal drift; and
- the optical filter apparatus and the polarization controller have a common controller that sets their input variables so that the optical power of the unmodulated optical carrier signal output from the optical filter apparatus is maximized.

The self-coherent optical transmission system advantageously mitigates phase noise transfer from a local oscillator signal to a received modulated optical signal without requiring the use of costly narrow linewidth lasers. It does not require any recovery of frequency offset between local oscillator and transmitted optical carrier. The optical front-end of the receiver may be cost effectively implemented in Silicon Photonics. The concurrent control of received signal polarization and optical carrier extraction, using the optical filter apparatus, mitigates the issues of current polarization controllers in terms of dynamic range and outage probability.

Figure 7:
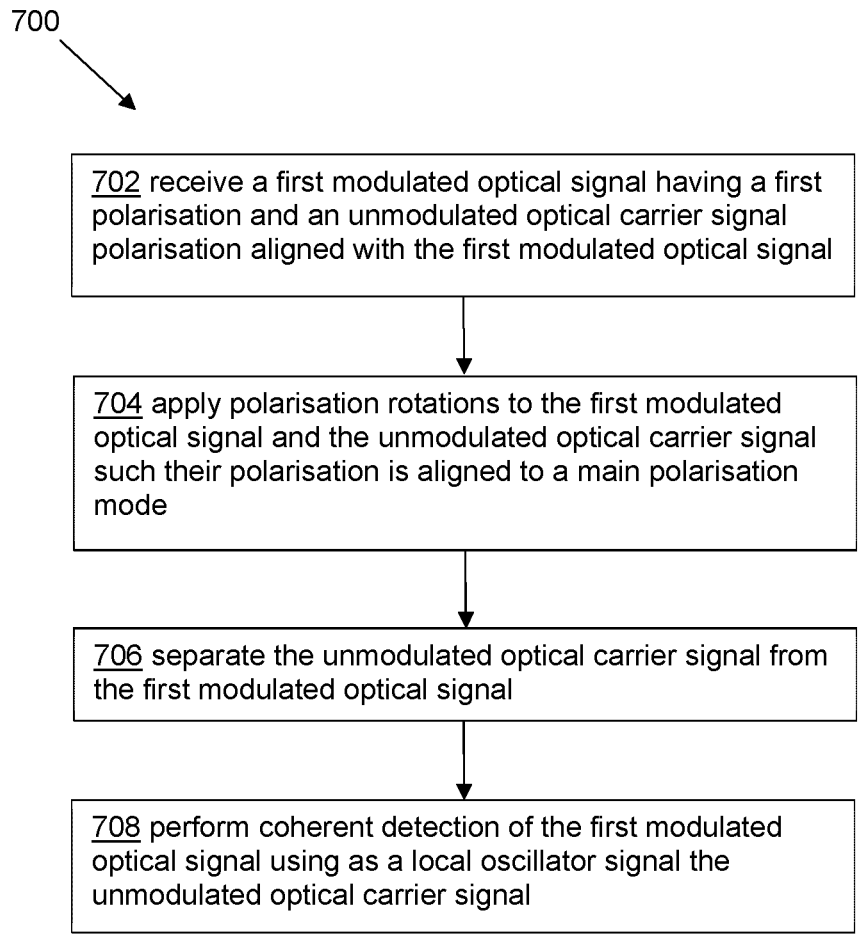
FIGS. 7 and 8 are flowcharts illustrating embodiments of method steps.

Referring to FIG. 7 an embodiment provides a method 700 of coherent optical detection.

The method comprises steps of:
- receiving 702 a first modulated optical signal having a first polarisation and an unmodulated optical carrier signal polarisation aligned with the first modulated optical signal, the first modulated optical signal having negligible spectral power density within a predetermined bandwidth, BW, around an optical spectrum of the optical carrier signal;
- then, applying polarisation rotations 704 to the first modulated optical signal and the unmodulated optical carrier signal such that their polarisation is aligned to a main polarisation mode,
- then, acting on said signals aligned to the main polarisation mode, separating 706 the unmodulated optical carrier signal from the first modulated optical signal; and
- then, using said separated signals, performing 708 coherent detection of the first modulated optical signal using as a local oscillator signal the unmodulated optical carrier signal.

In an embodiment, the method further comprises steps of:
- receiving a second modulated optical signal having a second polarisation orthogonal to the first polarisation;
- separating the second modulated optical signal from the first modulated optical signal and the unmodulated optical carrier signal; and using said separated signals, performing coherent detection of the second modulated optical signal using as a local oscillator signal the unmodulated optical carrier signal.

In an embodiment, the step of separating the unmodulated optical carrier signal from the first modulated optical signal comprises band splitting the unmodulated optical carrier signal and the first modulated optical signal. The band splitting is arranged to send optical signals within a first spectral band including the optical spectrum of the unmodulated optical carrier signal to a first output and to send optical signals within a second spectral band including an optical spectrum of the first modulated optical carrier signal to a second output.

In an embodiment, the first spectral band has a bandwidth greater than twice a linewidth of the optical spectrum of the unmodulated optical carrier signal and less than twice the predetermined bandwidth, BW.

In an embodiment, the method further comprises varying the applied polarisation rotations and tuning at least one of the first spectral band and the second spectral band until an optical power of the unmodulated optical carrier signal after the step of separating is maximised.

Figure 8:
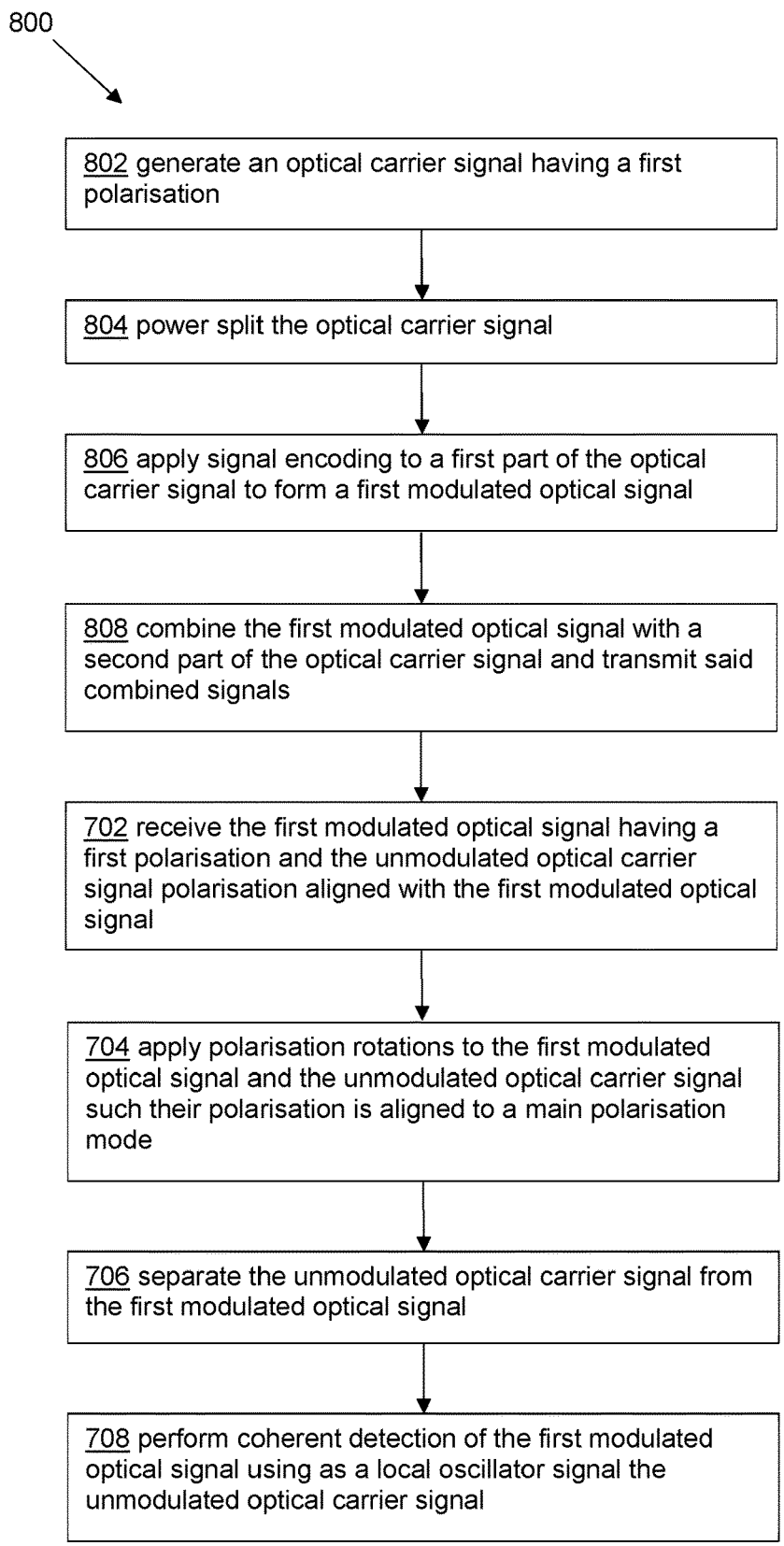

Referring to FIG. 8, an embodiment provides a method of self-coherent optical transmission 800.

The method comprises transmission steps of:
generating 802 an optical carrier signal having a first polarisation;
power splitting 804 the optical carrier signal;
applying 806 signal encoding to a first part of the optical carrier signal to form a first modulated optical signal, the signal encoding configured to cause the first modulated optical signal to have negligible spectral power density within a predetermined bandwidth, BW, around an optical spectrum of the optical carrier signal;
combining 808 the first modulated optical signal with a second, unmodulated, part of the optical carrier signal, wherein the first modulated optical signal has a first polarisation and the unmodulated optical carrier is polarisation aligned with the first modulated optical signal;
transmitting said combined signals.

The method further comprises, following transmission, steps of receiving and detecting the first modulated optical signal according to the method 700 of coherent optical detection described above.

In an embodiment, the step of applying signal encoding comprises polarisation splitting the first part of the optical carrier signal into a first optical signal having the first polarisation and a second optical signal having a second, orthogonal polarisation. Respective signal encodings are then applied to the first and second optical signals to form the first modulated optical signal having the first polarisation and a second modulated optical signal having the second, orthogonal polarisation.

In an embodiment, the signal encoding applied to the first optical signal has a cut off frequency equal to or higher than the predetermined bandwidth, BW.

The invention claimed is:

1. A self-coherent optical transmission system comprising:
an optical receiver that comprises a polarisation controller arranged to receive as its input a first modulated optical signal having a first polarisation and an unmodulated optical carrier signal polarisation aligned with the first modulated optical signal, wherein the first modulated optical signal has negligible spectral power density within a predetermined bandwidth around an optical spectrum of the unmodulated optical carrier signal;
an optical filter apparatus having a main polarisation mode;
a coherent optical receiver apparatus, wherein:
the polarisation controller is arranged to apply polarisation rotations to the first modulated optical signal and the unmodulated optical carrier signal such that their polarisation is aligned to the main polarisation mode of the optical filter apparatus,
the optical filter apparatus is arranged to receive the unmodulated optical carrier signal and the first modulated optical signal from the polarisation controller and is arranged to separate the unmodulated optical carrier signal from the first modulated optical signal, and
the coherent optical receiver apparatus is arranged to receive said separated signals from the optical filter apparatus and to perform coherent detection of the first modulated optical signal by using the unmodulated optical carrier signal as a local oscillator signal; and
an optical transmitter comprising:
an optical source arranged to generate an optical carrier signal;
an optical modulator; and
an optical splitter arranged to power split the optical carrier signal and arranged to route a first part of the optical carrier signal to the optical modulator and to route a second part of the optical carrier signal to bypass the optical modulator,
wherein:
the optical modulator is arranged to apply signal encoding to the first part of the optical carrier signal to form a first modulated optical signal,
the signal encoding is configured to cause the first modulated optical signal to have negligible spectral power density within a predetermined bandwidth around an optical spectrum of the optical carrier signal;
the first modulated optical signal has a first polarization;
the unmodulated optical carrier signal is polarisation-aligned with the first modulated optical signal; and
the optical transmitter is configured to combine the first modulated optical signal and the unmodulated optical carrier signal for transmission.

2. The self-coherent optical transmission system of claim 1, wherein:
the optical modulator comprises a dual polarisation modulator arranged to split the first part of the optical carrier signal into a first optical signal having the first polarisation and a second optical signal having a second, orthogonal polarisation;
the dual polarisation modulator is arranged to apply respective signal encodings to the first and second optical signals to form a first modulated optical signal having the first polarisation and a second modulated optical signal having the second, orthogonal polarisation; and
the dual polarisation modulator is configured to combine the first modulated optical signal and the unmodulated optical carrier signal for transmission.

3. The self-coherent optical transmission system of claim 1, wherein the optical modulator is arranged to apply signal encoding having a cut off frequency equal to or higher than the predetermined bandwidth.

4. A method of self-coherent optical transmission, the method comprising:
generating an optical carrier signal having a first polarisation;

power splitting the optical carrier signal;
applying signal encoding to a first part of the optical carrier signal to form a first modulated optical signal, the signal encoding configured to cause the first modulated optical signal to have negligible spectral power density within a predetermined bandwidth around an optical spectrum of the optical carrier signal;
combining the first modulated optical signal with a second, unmodulated, part of the optical carrier signal, wherein the first modulated optical signal has a first polarisation and the unmodulated optical carrier is polarisation aligned with the first modulated optical signal;
transmitting said combined signals; and
after transmission, receiving and detecting the first modulated optical signal by:
receiving the first modulated optical signal having a first polarisation and an unmodulated optical carrier signal that is polarisation aligned with the first modulated optical signal, wherein the first modulated optical signal has negligible spectral power density within a predetermined bandwidth around an optical spectrum of the optical carrier signal;
then, applying polarisation rotations to the first modulated optical signal and the unmodulated optical carrier signal such that their polarisation is aligned to a main polarisation mode,
then, acting on said signals aligned to the main polarisation mode, separating the unmodulated optical carrier signal from the first modulated optical signal; and
then, using said separated signals, performing coherent detection of the first modulated optical signal using as a local oscillator signal the unmodulated optical carrier signal.

5. The method of claim 4, wherein applying signal encoding comprises:
polarisation splitting the first part of the optical carrier signal into a first optical signal having the first polarisation and a second optical signal having a second, orthogonal polarization; and
applying respective signal encodings to the first and second optical signals to form the first modulated optical signal having the first polarisation and a second modulated optical signal having the second, orthogonal polarisation.

6. The method of claim 4, wherein the signal encoding applied to the first optical signal has a cut off frequency equal to or higher than the predetermined bandwidth.

\* \* \* \* \*